(12) United States Patent
Cronyn

(10) Patent No.: US 6,710,737 B1
(45) Date of Patent: Mar. 23, 2004

(54) CALIBRATOR FOR RADAR TARGET SIMULATOR

(75) Inventor: Willard M. Cronyn, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/323,190

(22) Filed: Dec. 18, 2002

(51) Int. Cl.[7] ................................................. G01S 7/40
(52) U.S. Cl. ....................................... 342/174; 342/169
(58) Field of Search ................................ 342/165, 169, 342/170, 171, 172, 173, 174

(56) References Cited

U.S. PATENT DOCUMENTS

| | | |
|---|---|---|
| 3,169,244 A | 2/1965 | Scribner et al. |
| 3,323,123 A | 5/1967 | Hegarty et al. |
| 3,641,574 A | 2/1972 | Douglas |
| 3,683,381 A * | 8/1972 | Strenglein .................... 342/169 |
| 3,792,475 A * | 2/1974 | Smetana ...................... 342/168 |
| 3,898,662 A * | 8/1975 | Hom et al. .................... 342/15 |
| 3,903,521 A | 9/1975 | Jensen et al. |
| 4,168,502 A | 9/1979 | Susie |
| 4,195,300 A | 3/1980 | Gouley |
| 4,644,357 A | 2/1987 | Schaaf et al. |
| 4,982,196 A | 1/1991 | Thomas et al. .............. 342/172 |
| 5,164,734 A * | 11/1992 | Fredericks et al. .......... 342/172 |
| 5,223,840 A | 6/1993 | Cronyn ........................ 342/170 |
| 5,351,054 A * | 9/1994 | Fredericks et al. .......... 342/172 |
| 5,359,331 A * | 10/1994 | Adler ........................... 342/124 |
| 5,457,463 A | 10/1995 | Vencel et al. ................ 342/169 |
| 5,493,304 A * | 2/1996 | Lee et al. .................... 342/360 |
| 5,818,384 A | 10/1998 | Nishri ......................... 342/174 |
| 5,870,055 A | 2/1999 | Kim ............................ 342/169 |

OTHER PUBLICATIONS

"A new direct millimeter wave six–port receiver", Tatu, S.O.; Moldovan, E.; Ke Wu; Bosisio, R.G.; Microwave Symposium Diges 2001 IEEE MTT–S International, Vol: 3, May 20–25, 2001 Page(s): 1809–1812.*

"Universal eight–port RC network", Vrba, K.; Cajka, J.; Lattenberg, I.; Electronics, Circuits and Systems, 1999. Proceedings of ICECS '99. The 6th IEEEInt'l Conf. on, Vol: 3, Sep. 5–8, 1999 Ps: 1317–1320.*

"A mature mixed–mode simulator", Sullivan, S.K.; Circuits and Systems, 1989., IEEE International Symposium on, May 8–11, 1989 Page(s): 689–692 vol. 1.*

Cronyn, Will et al.; Universal Radar Moving Target Transponder; I.E.E.E, 1996, USA.

* cited by examiner

Primary Examiner—John B. Sotomayor
(74) Attorney, Agent, or Firm—Peter A. Lipovsky; Michael A. Kagan; Andrew J. Cameron

(57) ABSTRACT

An apparatus and process makes it possible to quickly and accurately determine an equivalent for the radar cross section and range delay of a signal provided by a radar target simulator system. This calibration process considers the gain and delays associated with a radar target generator, the receive and transmit antennas associated with the generator, and the receive and transmit cables going to and from the generator to the receive and transmit antennas, respectively. Accurately determining gain and delay through the radar target simulator system permits the simulator to provide a well-calibrated radar cross section and range for radars it is testing and calibrating.

12 Claims, 4 Drawing Sheets

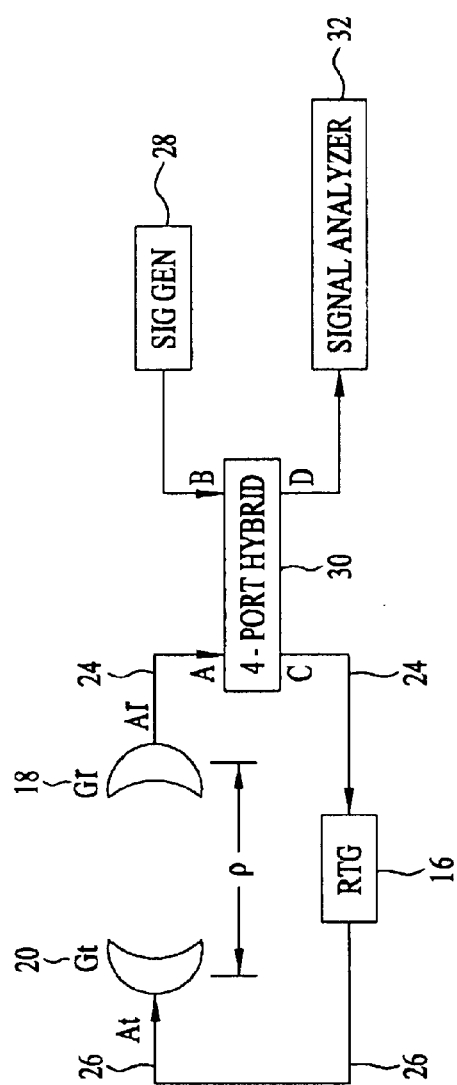
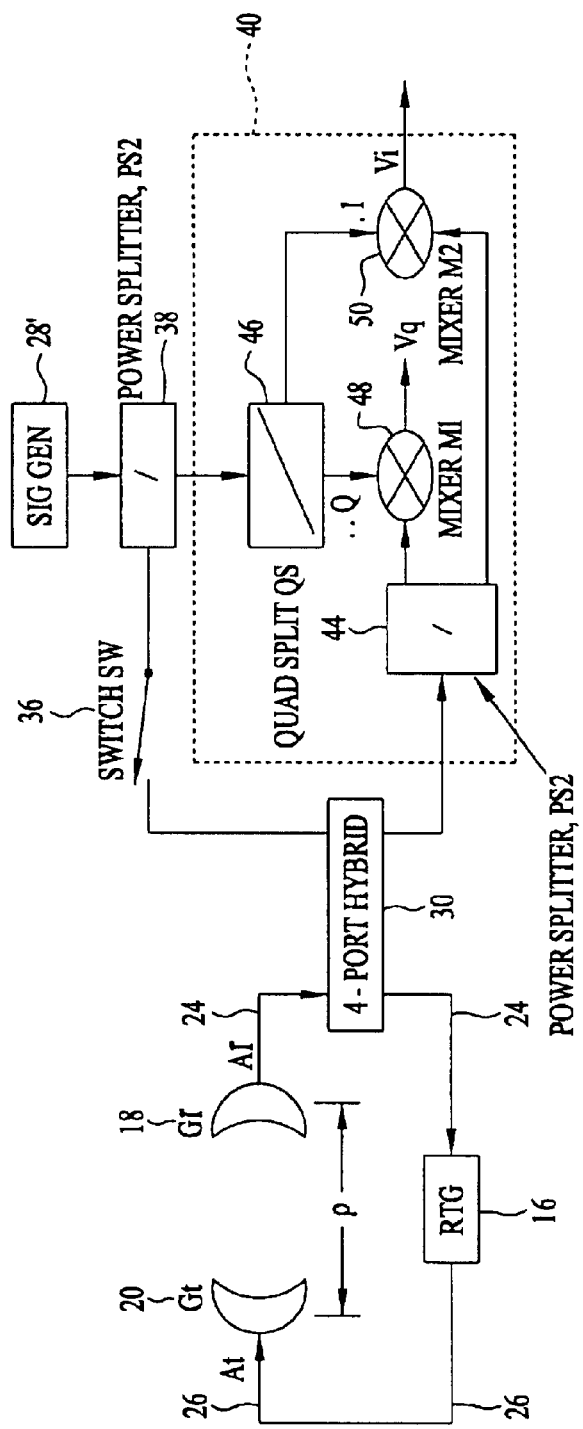
FIG. 2
FIG. 4

US 6,710,737 B1

CALIBRATOR FOR RADAR TARGET SIMULATOR

BACKGROUND OF THE INVENTION

FIG. 1 shows a scheme for testing a radar. In this scheme, a radar target simulator system 10 is located a distance r from a radar under test (RUT)12, and is used to generate an apparent target 14 that is located a greater distance R from radar 12. The characteristics of the simulated target, such as delay and radar cross section (RCS), are established by the simulator so that the performance and functionality of the RUT can be verified. Radar target simulators can be designed for a specific radar to be tested or can be designed for use with the testing of many different types of radars. Examples of the latter of these can be found in U.S. Pat. No. 5,223,840 and in the article titled *Universal Radar Moving Target Transponder*, presented at the IEEE 1996 National Radar Conference, Ann Arbor, Mich., May 13–16, 1996. Both of these publications are incorporated by reference herein.

To verify that the RUT is functioning properly, it is necessary that the target simulator equipment used to test it be accurately calibrated. Calibrating a radar target simulator requires knowing the gain and delay through the simulator, including all of its components such as the radar target generator and its associated antennas and transmission cables.

In many radar test configurations, the simulator will use antennas that are located a significant distance from its accompanying radar target generator 16. These antennas, shown as elements 18 and 20 in FIG. 1, and the associated cables, elements 24 and 26, may even be in locations that are difficult to physically access, such as on towers or rooftops.

Traditionally, calibration of the simulator for gain and delay are performed in two distinct operations.

While it is easy to measure the gain of the radar target generator itself (from its input to output), ascertaining the gain associated with the transmission cables running from the target generator to its antennas can be problematic. This is particularly true when sections of the receive and transmit cables running to and from the antennas are changed over the course of time, requiring ideally that separate gain measurements be made for the target generator and for the cables. An even greater challenge is measurement of the receive and transmit antennas gains themselves. Vendor-provided specifications of antenna gain are frequently subject to significant errors. Though archived measurements can be useful, they often must be fitted/interpolated for the particular frequency of each RUT. Additionally, archived values can change over time as an antenna degrades. Thus the over-all determination of the parameters which enter into the gain calibration of a radar target simulator is a fragmented process, not integrated into a single measurement.

Determining the over-all delay through a radar target simulator is also desirable in order to properly calibrate the simulator. Traditional measurements of over-all delay are subject to some of the same problems as gain measurement such as the inaccessibility of cables and use of a fragmented measurement process.

SUMMARY OF THE INVENTION

An apparatus and process makes it possible to quickly and accurately determine an equivalent for the RCS and range delay of a signal provided by a radar target simulator system. This calibration process considers the gain and delays associated with a radar target generator, the receive and transmit antennas associated with the generator, and the receive and transmit cables going to and from the generator to the receive and transmit antennas, respectively. Accurately determining gain and delay through the radar target simulator system permits the simulator to provide a well-calibrated RCS and range for radars it is testing and calibrating.

An object of this invention is to provide a calibrator for a radar target simulator that permits the over-all gain of the simulator to be determined.

Another object of this invention is to provide a calibrator for a radar target simulator that permits the RCS of a simulator signal as received by a RUT to be determined.

A further object of this invention is to provide a calibrator for a radar target simulator that permits the over-all delay through the simulator to be determined.

Other objects, advantages and new features of the invention will become apparent from the following detailed description when considered in conjunction with the accompanying drawings.

BRIEF DESCRIPTION OF THE DRAWINGS

FIG. 2 illustrates an embodiment of the invention suitable for determining over-all gain and over-all delay of a signal from a radar target simulator.

FIG. 4 illustrates another embodiment of the invention suitable for determining over-all delay of a signal from a radar target simulator.

DESCRIPTION

Figure 1:
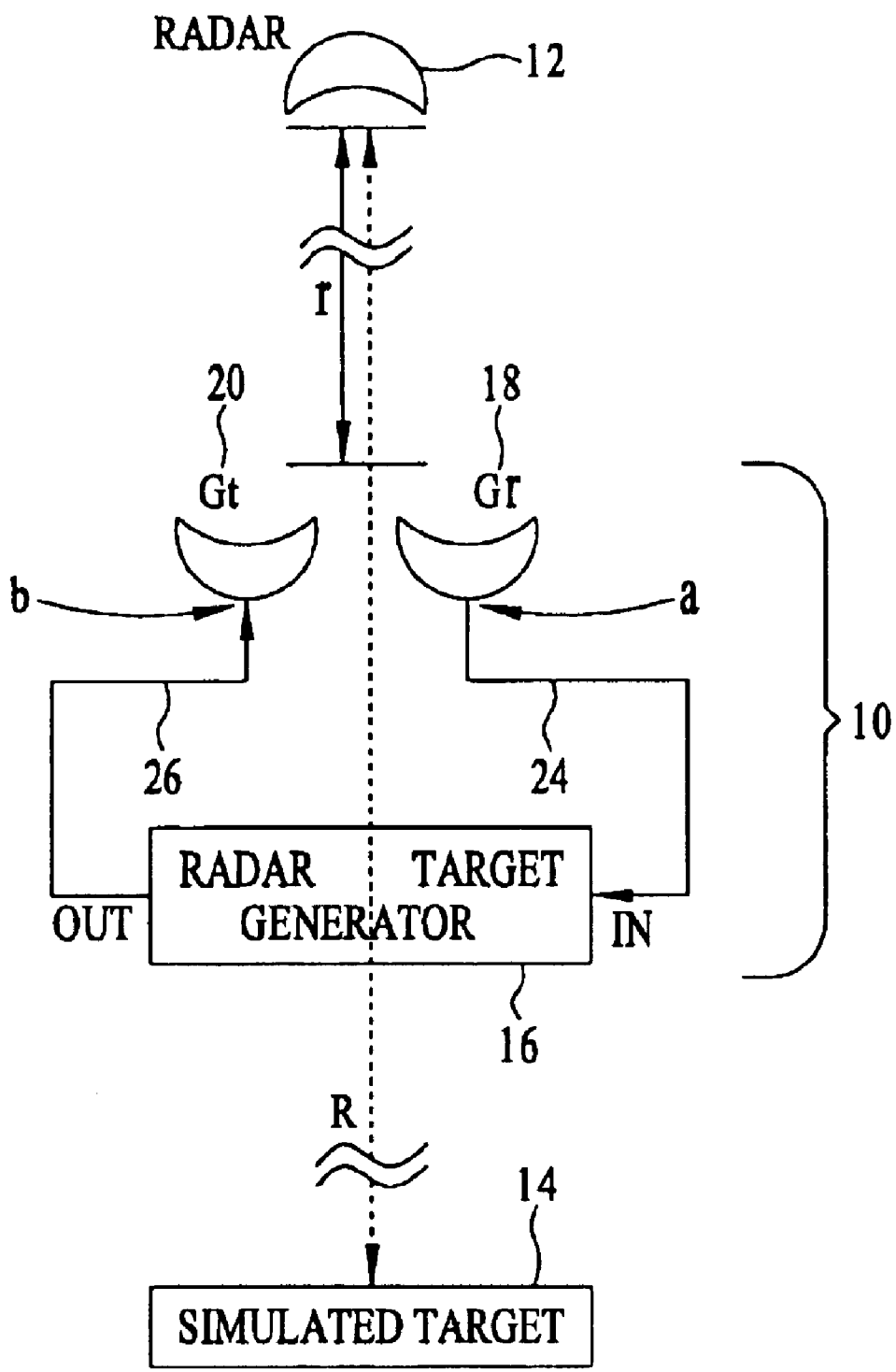
FIG. 1 illustrates a radar target simulator disposed to test a radar.

To understand the invention, it is important to understand the basic configuration for a radar target simulator system. Referring once again to FIG. 1, a radar target simulator 10 includes radar target generator 16 coupled by transmission cables 24 and 26 to receive antenna 18 and transmit antenna 20, respectively. Antennas 18 and 20 are shown at a distance r from RUT 12. Target generator 16 captures an incident radar signal from radar 12 through receive antenna 18 with a gain of Gr dBi, (dB above isotropic). In its usual operation mode, the target generator will retransmit the captured radar signal back to the RUT through transmit antenna 20 (with a gain of Gt dBi) after a delay of $2*(R-r)/c$, where c=speed-of-light. The re-transmitted signal gives the RUT the appearance of a target 14 at a distance R from tested radar 12.

The distance r can be determined extremely accurately, for example by using GPS (Global Positioning Satellite) determined coordinates for both the RUT and the simulator antennas. For example, if r is 10 km and it is desired to place a target at 159.896229 km, the delay time through the entire radar target simulator system, from receive antenna to transmit antenna, must correspond to 149.896 km, which is a time delay of exactly 1000.000 usec.

Within the target generator itself, the delays which contribute to the dominant delay (that desired for range simulation) are highly precise and digitally-controlled. However, there are also delays associated with the transmission cables (or waveguides) as well as "overhead" digital delays (FIFO and A/D and D/A) which are a significant, fixed, delay contribution which, if not accounted for, could result in an unacceptable error if the RUT target-range estimate is to be accurately calibrated.

With regard to the amplitude of the signal re-transmitted by the radar target generator, it should be understood that for a real target, the ratio of:

[power flux (power/unit area) incident on the antenna of the RUT for the signal reflected from the target back to the RUT] to

[ERP transmitted by the RUT]

depends on the ratio $RCS/R^4$ where RCS is the parameter for the effective target radar reflection size, and R is the target-to-radar distance. (ERP is Effective Radiated Power)

To calibrate the RUT to, or test its sensitivity for, a target of some given RCS located a distance R from the RUT, the radar target generator must provide a power flux at the RUT which is identical to that from the target, taking into account the distance, r, of the radar target simulator from the RUT; the apparent distance, R, of the target from the RUT; and the gain of all components of the radar target simulator system, including its associated antennas and transmission cables.

It is by comparing the equations for the power flux at a tested radar from a distant target of given RCS to the equations for the power flux at a radar as retransmitted from the radar target generator that this new methodology can be understood. In the following explanation, units of distance, r and R, are in meters; RCS is in square meters.

The power flux (S) at a radar of some given Effective Radiated Power ( Effective Radiated Power=Radar Transmitter Power into the radar antenna×Effective Radar Antenna Gain) from a target of some given RCS at a distance R from the radar may be most conveniently expressed in dBm (where dBm is dB above 1 mw=10*log(ERPm), ERPm is ERP in milliwatts and RCS is expressed in sdBsm where sdBsm is RCS in dB above 1 square meter, see *Modern Radar System Analysis*, by David K. Barton, Artech House, 1988, Eqn 1.2.4) as:

$$S(ERPdBmr, sdBsm, R) = ERPdBmr + sdBsm - 20 \cdot \log(4 \cdot \pi R^2) \quad 1a)$$

or, numerically as:

$$S(ERPdBmr, sdBsm, R) = ERPdBmr + sdBsm - 40 \cdot \log(R) - 21.984 \quad 1b)$$

The power out of a receive antenna of gain Gr, in dB above isotropic (assuming the receive antenna polarization is matched to that of the radar), for a radar of power ERPdBm, at a distance r from the radar, at a wavelength W (in meters), is given by:

$$Pr(ERPdBmr, r, Gr, W) = ERPdBmr - 10 \cdot \log(4 \cdot \pi \cdot r^2) + Gr + 20 \cdot \log(W) - 10 \cdot \log(4 \cdot \pi) \quad 2a)$$

or using the relationship between W, meters, and frequency, in GHz, fG:

$$2b) \quad Pr(ERPdBmr, r, Gr, fG) = ERPdBmr - 10 \cdot \log(4 \cdot \pi \cdot r^2) + Gr + 20 \cdot \log\left(\frac{0.29979}{fG}\right) - 10 \cdot \log(4 \cdot \pi)$$

Equation 2b) gives the power out of the radar target generator receive antenna 18 shown in FIG. 1.

The power flux from target generator 16 at radar 12 for distance r is given by:

$$S(ERPdBmt, Gt, r) = ERPdBmt - 10 \cdot \log(4 \cdot \pi \cdot r^2) \quad 3)$$

where ERPdBmt is the effective power transmitted by generator 16.

But the effective power transmitted by generator 16, given the power out (Pr) of receive antenna 18, net system gain Ga from the output of receive antenna 18 to the input to transmit antenna 20 (path a–b in FIG. 1), and transmit antenna 20 gain Gt is:

$$ERPdBmt(Pr, Gt, Ga) = Pr + Ga + Gt \quad 4)$$

Substituting 4) into 3) gives the target generator 16 power flux at radar 12 as $$S(Pr, Ga, Gt, r) = Pr + Ga + Gt - 10 \cdot \log(4 \cdot \pi \cdot r^2) \quad 5a)$$

and substituting the expression for Pr from 2b) into 5a) gives:

$$5b) \quad S(ERPdBmr, Gr, fG, Ga, Gt, r) = ERPdBmr - 10 \cdot \log(4\pi \cdot r^2) + Gr + 20 \cdot \log\left(\frac{0.29979}{fG}\right) - 10 \cdot \log(4 \cdot \pi) + Ga + Gt - 10 \cdot \log(4\pi \cdot r^2)$$

with the numerical result:

$$S(ERPdBmr, Gr, fG, Ga, Gt, r) = ERPdBmr - 40 \cdot \log(r) + Gr + Ga + Gt - 20 \cdot \log(fG) - 43.44 \quad 5c)$$

Making the flux from generator 16, as given by 5c), equal to the flux from a target of specified RCS for the same radar ERP gives the effective RCS of the target generator signal as:

$$sdBsm(R, Gr, fG, Ga, Gt, r) = -40 \cdot \log(r) + Gr + Ga + Gt - 20 \cdot \log(fG) + 40 \cdot \log(R) - 21.456 \quad 6)$$

where r is a measured value; R is the range of the synthetic target as controlled by the target generator (should there be any small errors, these will be eliminated by the delay calibration and their affect on apparent target RCS is considered negligible); and fG is known extremely accurately. Thus the unknowns, or the parameters which are to be calibrated, are Gr, Ga, and Gt.

These is no need to determine the values of these 3 parameters individually; as the calibration will yield a measurement of Gr+Ga+Gt as a single, lumped, parameter.

Now consider the calibration configuration, as shown in FIG. 2. The radar target generator receive 18 and transmit 20 antennas have been rotated so they face each other separated by a predetermined distance ρ. Distance ρ must be larger than the so-called "far field" distance of each antenna i.e., ρ>>2*D^2/W, where D is the aperture extent (diameter, or largest dimension of face of antenna) of the antenna, and W is the wavelength.

As shown in FIG. 2, a pulsed type signal generator is used as the signal source. It is connected to port B of a 4-port hybrid 30, a commonly-used microwave component. The 4-port hybrid 30 has the property that a signal injected at either ports A or B will exit at ports C and D. Signal loss from A to C or D is essentially identical to the signal loss from B to C or D, and is typically 3 dB plus a typically fractional-dB resistive loss which can easily be measured if desired.

Figure 3:
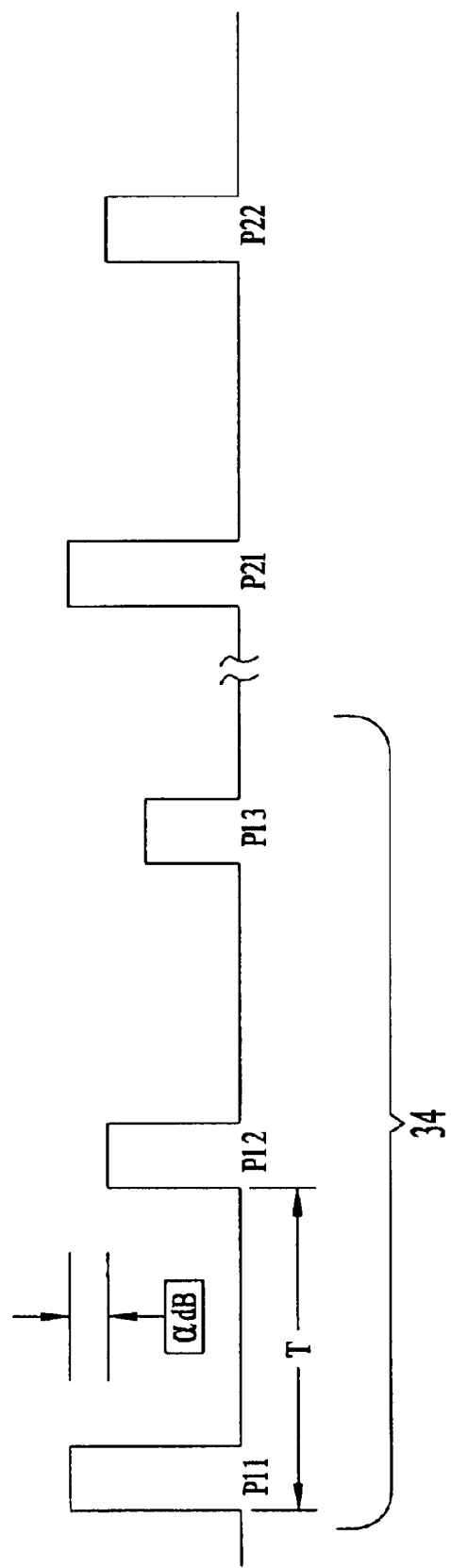
FIG. 3 illustrates first and second series of recirculating pulse trains as used in the embodiment of the invention shown in FIG. 2.

Consider a single pulse injected by signal generator 28 into port B of 4-port hybrid 30. The pulse will go into a signal analyzer 32, such as a spectrum analyzer, at port D and will also enter target generator 16 from port C. The target generator range delay is set by its operator to some nominal value, such as 1.49896 km, which is a time delay of exactly 10.00 usec. The delayed pulse from the target generator will then be transmitted through transmit antenna 20, received by receive antenna 18, enter port A, and appear a second time at the inputs of both signal analyzer 32 and target generator 16. The appearance of the pulses produced from this first signal generator pulse at signal analyzer 32 is resultant recirculating pulse train 34 as shown in FIG. 3. The gain through the radar target generator 16 is adjusted so each successive pulse through the generator is a few dB e.g., 3, lower than the preceding pulse. Otherwise the calibrator system will go into oscillation, with pulse amplitude building until system saturation (the noise level will also increase). Although the absolute precision of signal generators and spectrum analyzers can be difficult to accurately ascertain, the critical measurement for gain calibration is not an absolute one, but a relative one i.e., the few dB difference between consecutive pulses of the pulse train, shown in FIG. 3 as $\alpha dB$.

Referring again to FIG. 3, the time interval, T, between consecutive pulses, as for example shown for pulse train 34, gives the exact delay through the entire radar target simulator system. This system, as shown in FIG. 2, is the radar target generator 16, transmission cables 24 and 26, antennas 18 and 20, and the separation distance $\rho$ between the antennas. However, for gain measurement purposes $\rho$ can be measured entirely accurately (even with, say, a cloth tape measure). For example, for a radar target generator, range precision of 30 cm is considered high. As a free-space path, $\rho$ contributes a delay of 1 nsec/0.3 m~1 nsec/ft (where c=speed-of-light). For the pulse train shown in FIG. 3, the signal generator is periodically pulsed so that the recirculating pulse train seen at the signal analyzer after the first signal generator pulse is P11, P12, etc; the recirculating pulse train seen after the second signal generator pulse is P21, P22, etc, where Pmn denotes an analyzer pulse derived from a signal generator pulse m and n denotes the sequence number of the pulse. For an over-all interval of, say, 10 microseconds between recirculating pulse trains, an appropriate interval for the signal generator pulses is 250 microseconds (this permits new recirculating pulses to not overlap preceding recirculating pulses).

Now consider the equation for the amplitude of the second pulse Pm2 of a pulse train:

7) $Pm2(Pm1, Ga, Gt, \rho, Gr, W, Lad) =$ $$Pm1 + Ga + Gt - 10 \cdot \log(4 \cdot \pi \cdot \rho^2) + Gr + 10 \cdot \log\left(\frac{W^2}{4 \cdot \pi}\right) - Lad$$

where the only new term is Lad, the loss (dB) from port A to port D of the 4-port hybrid junction.

The value of Pm2 can also be written in terms of its decrease in amplitude from Pm1:

$$Pm2(\alpha dB, Pm1) = Pm1 - \alpha dB \qquad 8)$$

Equating equations 7) and 8) gives an equation for Ga+Gt+Gr and other parameters, all accurately known or numerical:

$$Gr + Ga + Gt = 20 \cdot \log(fG) + Lad + 32.471 - \alpha dB \qquad 9)$$

This expression for Gr+Ga+Gt can now be substituted into equation 6) to yield the equivalent RCS of the radar target generator signal as received at the tested radar antenna.

Equation 9) can also be used to determine the nominal Ga (target generator gain−transmission line loss) required for antennas of specified gain at a specified frequency, a specified Lad, and a desired $\alpha dB$.

For example, if fG=10 GHZ, Gr=Gt=6 dBi, Lad=3.5 dB, and $\alpha dB$=3 dB, Ga must be 47 dB. This will be only a preliminary estimate of the requisite Ga as the object of the alibration is to evaluate Ga+Gr+Gt.

Substituting the expression 9) for Ga+Gr+Gt into equation 6) for the effective RCS of the target generator signal gives:

$$sdBsm(R, fG, r, \alpha dB, \rho, Lad) = -40 \cdot \log(r) + (20 \cdot \log(\rho) + Lad + 11.015 - \alpha dB) + 40 \cdot \log(R) \qquad 10)$$

From 10) it may be seen that sdBsm is dependent only on parameters which are either specified extremely accurately (R) or can easily be extremely accurately measured (r, $\rho$, Lad, $\alpha dB$).

For most target generators, the target generator gain, Ga, can be varied. Thus the evaluation of Ga+Gr+Gt at one value of Ga can easily be extended, as incremental changes in Ga alone are very easily calibrated i.e., it is the fixed values of Gr, Gt and fixed overhead attenuation in the signal path for which it is difficult to make an absolute measurement. However, once a single absolute measurement has been made, there are many techniques, well-known to those skilled in the art of taking system gain measurements, which can be made to evaluate incremental changes in Ga+Gr+Gt caused by incremental changes in Ga.

As indicated above, measurement of the recirculating pulse train period, T, gives the sum of the total receive-to-transmit antenna delay through the system (the parameter to be calibrated) plus free-space propagation time $\rho/c$, which can be evaluated with a simple meter-stick measurement of the antenna separation. For most spectrum analyzers, because of their limited video and resolution bandwidths, the delay cannot be measured accurately enough on the spectrum analyzer itself for most precision delay requirements. However, most spectrum analyzers have a relatively wideband IF (Intermediate Frequency) output, typically at least 40 MHZ wide, which can be output to, for example, a log IF amplifier to thereby enable delay measurements to a precision of 10 nsec or somewhat better, depending on the response time of the amplifier.

For ultra-high precision timing delay measurements (fractional-nsec and less), though not RCS, the configuration of FIG. 4 can be used.

Switch 36 is used to momentarily turn on the path for the signal generator 28', such as a continuous wave generator, from a power splitter 38 to the 4-port hybrid, and then turn it off.

Figure 5:
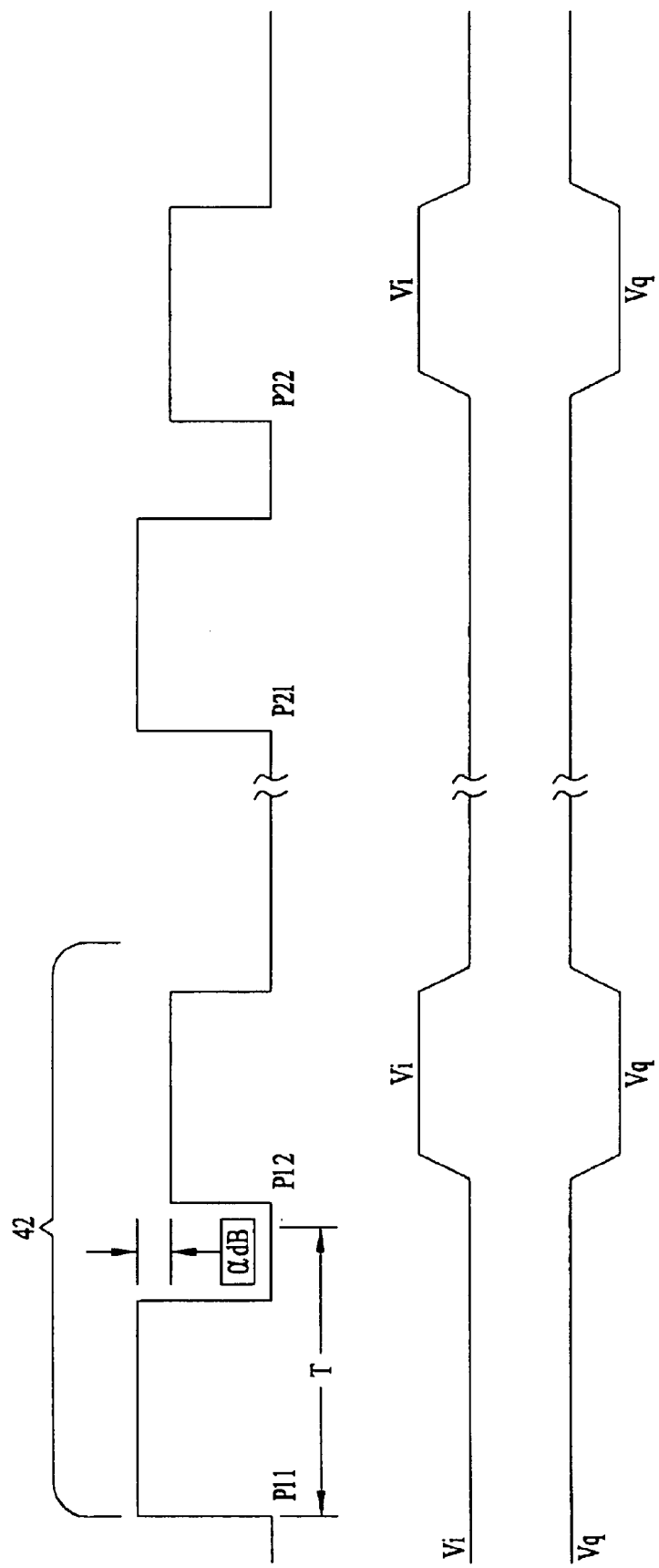
FIG. 5 illustrates first and second series of recirculating pulse trains as used in the embodiment of the invention shown in FIG. 4.

Assume that a crude estimate of the total path delay has been made from the time-domain configuration described above. Then, referring to the timing diagram of FIG. 5, switch 36 will be closed, turned on for a period somewhat less than T, and then opened (turned off). Period T is shown between consecutive pulses of pulse train 42. The measurements of in-phase and quadrature phase voltage out are made by phase detector 40 (enclosed by dashed lines) from the time switch 36 opens until somewhat before 2*T (when the 2nd-time-around pulse arrives at the phase detector; no measurements are made for the 2nd, and subsequent, pulses). Shown within phase detector 40 are 2nd power splitter 44, quadrature splitter 46, and mixers 48 and 50.

Phase is evaluated from the equation:

$$\phi = a\tan 2(vi, vq) \qquad 12)$$

where a tan 2 is the 4-quadrant arctangent function with, for convenience, values between 0 and 1 (1=360 degrees).

The ultra-high precision timing measurement is made by using the relationship between phase, time delay T, and frequency f:

$$\phi = f*T \quad (13a)$$

or change in phase Dφ, and change in frequency Df:

$$D\phi Df*T \quad (13b)$$

The increment in frequency must be small enough to ensure that there are no phase ambiguities i.e., that a change in phase is not, in fact, N+3 rotations, N=1,2, ... when it appears to be 0.3 rotations. Thus the increment in frequency should be ~1/(3*T), which would give an increment of about 1/3 rotation. The total change in frequency should be at least ~1/(3*dT), where dT is the desired timing precision.

For example, suppose the nominal measurement indicates a delay of 10 usec and the desired timing precision is 0.1 usec. Then the frequency increment should be no more than ~(1/30)MHZ=~30 kHz and the measurements should be made over a frequency extent of at least ~(1/0.3)~3 MHZ.

It is not necessary to take measurements at the given frequency increment across the entire frequency extent. A "boot-strapping" procedure can be used in which a small number of measurements can be made using progressively-increasing increments of frequency across a progressively-increasing frequency extent, thereby reducing the total number of measurements which must be made. However, this strategy is required only if the ratio of time delay to timing precision is very high.

The invention's capability of permitting gain, RCS, and timing delay measurement enables a radar target generator to provide a target return that is easily calibrated in both absolute RCS and timing delay for an entire radar target simulator system, from receive-to-transmit antenna. This simple absolute RCS calibration is accomplished using a laboratory instrument (for example, the spectrum analyzer) which is only required to be in relative calibration over a dynamic range of a few dB. The calibration technique uses receive and transmit antennas that are physically pointed at each other, while no physical access to the antennas or the target generator-to-antenna cabling (waveguide) is required. The calibration technique also yields an absolute calibration of all delays within the target generator system including the target generator itself and all external cabling.

Obviously, many modifications and variations of the invention are possible in light of the above description. It is therefore to be understood that within the scope of the claims the invention may be practiced otherwise than as has been specifically described.

What is claimed is:

1. A method comprising:
   providing a radar target generator, said radar target generator having a gain that is set to step-down gain for succeeding pulses processed by said radar target generator;
   providing a transmit antenna, an output of said radar target generator being operably coupled to said transmit antenna;
   providing a receive antenna, wherein said transmit and receive antennas are oriented towards each other and said antennas are separated by a predetermined distance;
   providing a signal generator;
   providing a signal analyzer;
   providing a 4-port hybrid junction, an output of said receive antenna being operably coupled as a first input to said 4-port hybrid junction and an output of said signal generator being operably coupled as a second input to said 4-port hybrid junction, a first output of said 4-port hybrid junction being operably coupled to an input of said radar target generator and a second output of said 4-pot hybrid being operably coupled to said signal analyzer,
   wherein said signal generator provides a signal that is regenerated by said radar target generator, resulting in a pulse train of recirculating pulses provided to said signal analyzer, and
   wherein said pulses of said recirculating pulse train are used to determine a transmission characteristic of said radar target generator, said transmit and receive antennas, said couplings between said radar target generator and said antennas and said predetermined distance between said antennas.

2. The method of claim 1 wherein said signal generator is a pulsed signal generator.

3. The method of claim 2 wherein said signal analyzer is a spectrum analyzer.

4. The method of claim 1 wherein said signal generator is a continuous wave signal generator.

5. The method of claim 3 wherein said signal analyzer is a phase detector.

6. The method of claim 1 wherein a cumulative gain of said radar target generator, said transmit and receive antennas, said couplings between said radar target generator and said antennas and said predetermined distance between said antennas is a function of a difference in amplitude of two consecutive pulses in said recirculating pulse train.

7. The method of claim 1 wherein a delay between two consecutive pulses in said recirculating pulse train is substantially equated with a cumulative delay of said radar target generator, said transmit and receive antennas, said couplings between said radar target generator and said antennas and said predetermined distance between said antennas.

8. An apparatus comprising:
   a radar target generator;
   a transmit antenna, an output of said radar target generator being operably coupled to said transmit antenna;
   a receive antenna, wherein said transmit and receive antennas are oriented towards each other and said antennas are separated by a predetermined distance;
   a signal generator;
   a signal analyzer; and
   a 4-port hybrid junction, an output of said receive antenna being operably coupled as a first input to said 4-port hybrid junction and an output of said signal generator being operably coupled as a second input to said 4-port hybrid junction, a first output of said 4-port hybrid junction being operably coupled to an input of said radar target generator and a second output of said 4-pot hybrid being operably coupled to said signal analyzer.

9. The apparatus of claim 8 wherein said signal generator is a pulse signal generator.

10. The apparatus of claim 9 wherein said signal analyzer is a spectrum analyzer.

11. The apparatus of claim 8 wherein said signal generator is a continuous wave signal generator.

12. The apparatus of claim 11 wherein said signal analyzer is a phase detector.

* * * * *